May 25, 1965

M. G. CHATELAIN 3,185,989

WIDE ANGLE GLIDE PATH SYSTEM

Filed Nov. 8, 1962

INVENTOR.
MAURICE G. CHATELAIN
BY
Knox & Knox

BEAM DIRECTION

INVENTOR.
MAURICE G. CHATELAIN
BY Knox & Knox

May 25, 1965     M. G. CHATELAIN     3,185,989
WIDE ANGLE GLIDE PATH SYSTEM

Filed Nov. 8, 1962     3 Sheets-Sheet 3

*INVENTOR.*
MAURICE G. CHATELAIN
BY
*Knox & Knox*

United States Patent Office 3,185,989
Patented May 25, 1965

3,185,989
WIDE ANGLE GLIDE PATH SYSTEM
Maurice G. Chatelain, San Diego, Calif., assignor to The Ryan Aeronautical Co., San Diego, Calif.
Filed Nov. 8, 1962, Ser. No. 236,261
7 Claims. (Cl. 343—108)

The present invention relates generally to aircraft guidance and more particularly to a wide angle glide path system.

Most instrument landing systems in present use involve two antennas transmitting radio signals in a generally confined beam pattern or in a conical pattern, the receiving equipment in the aircraft indicating the proper glide path from a comparison of the two received signals. Usually the antennas are upright structures along the sides of a runway, which constitute hazards to aircraft and cannot provide an approach beam directly along the center line of the runway. Antennas have been developed which can be mounted flush with the surface directly in the runway to provide accurate guidance, an example of such an antenna being illustrated and described in my co-pending application for a vertically polarized antenna for glide path system, filed March 9, 1962, Serial No. 178,758. This type of antenna used in properly spaced arrays provides a closely controlled glide path beam at the optimum angle, but the glide path indication at a constant elevation angle tends to vary with changes in azimuth from the center line of the beam. This makes it necessary for aircraft to fly precisely along the beam to ensure accurate glide path indication. For general use where such accurate flight control might not always be practical it is desirable to widen the range of azimuth over which the glide path indication is accurate.

Objects

The primary object of this invention, therefore, is to provide a glide path system wherein the effective beam, which indicates the glide path along which an aircraft must fly, maintains its accuracy over a considerable angular range in azimuth.

Another object of this invention is to provide a glide path system wherein arrays of antennas are arranged in particular patterns which produce the required wide angle characteristics.

Another object of this invention is to provide a glide path system which is especially adaptable to antennas mounted flush in a runway surface in the actual landing path of aircraft.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Basic system

In the basic glide path system the glide path indication is obtained from the phase relationship of two signals received from a pair of antennas. The phase is a function of the spacing between the pair of antennas and the complex angle of elevation and azimuth of the effective antenna array axis and the line of transmission. From this it will be evident that the signals from different two-antenna arrays oriented at different angles can be received in phase if the spacing of each pair has the proper relationship.

Received signals are usually interpreted in terms of ON GLIDE PATH if the aircraft is correctly aligned, FLY DOWN if the aircraft is above the glide path, and FLY UP if the aircraft is below the glide path. With the proper antenna spacing of S a true ON GLIDE PATH indication results at the proper position. If the spacing is less than S a FLY DOWN error results, while if the spacing is more than S a FLY UP error results. When multiple antenna arrays are used at different orientations to cover a wide angle of azimuth, the multiple received signals will include some FLY DOWN errors and some FLY UP errors when received by an aircraft in a specific position. By arranging the antenna array spacing so that these errors effectively cancel out, a true glide path indication can be received over a wide azimuth angle. This can be accomplished by arranging the antennas in a particular pattern to obtain the necessary spacing.

Antenna arrangement

Figure 1:
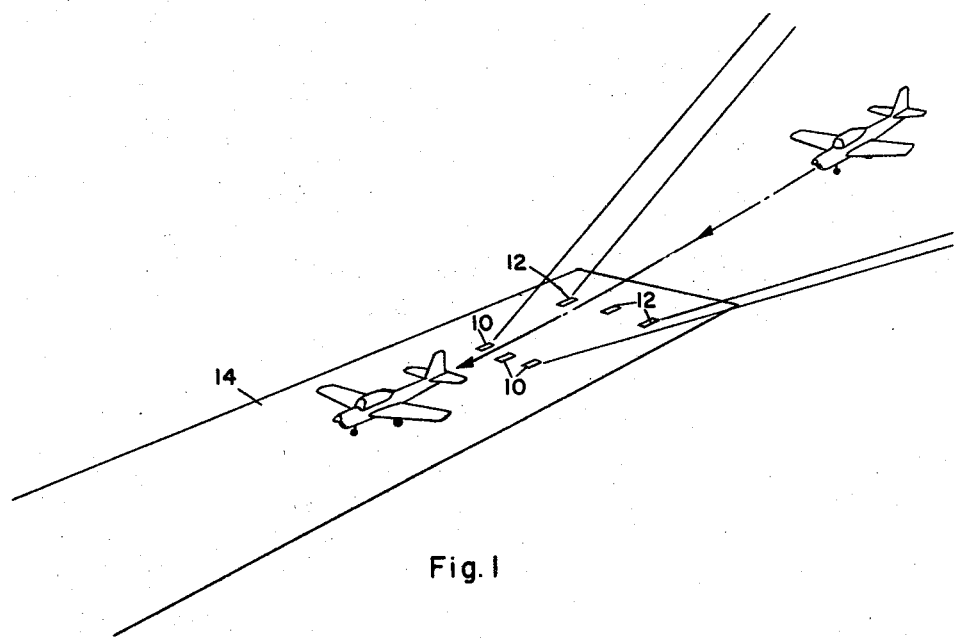
FIG. 1 is a diagrammatic view of an aircraft approaching a runway in which the antenna system is incorporated.
Figure 2:
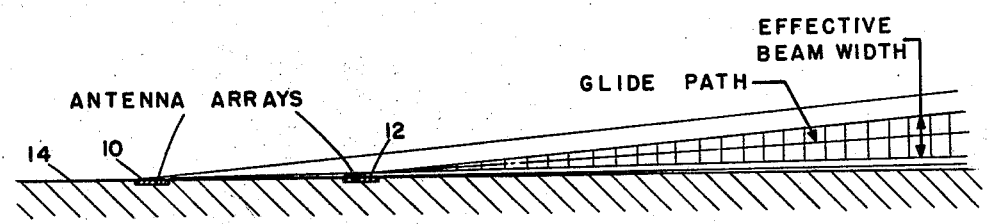
FIG. 2 is a diagrammatic side elevation view of the glide path configuration.

With reference to FIGS. 1 and 2 of the drawings, the arrays of antennas 10 and 12 are positioned in a runway 14 in longitudinally spaced relation. The antennas may be of the type described in the above mentioned co-pending application, or others of comparable characteristics. The radiation pattern being considered is endfire and a pair of antennas provides a pair of generally conical beams at a shallow angle of elevation, the beams overlapping as indicated by the shaded area in FIG. 2. The overlap represents the effective glide path along which the aircraft should fly in order to make a proper landing on the runway.

Figure 4:
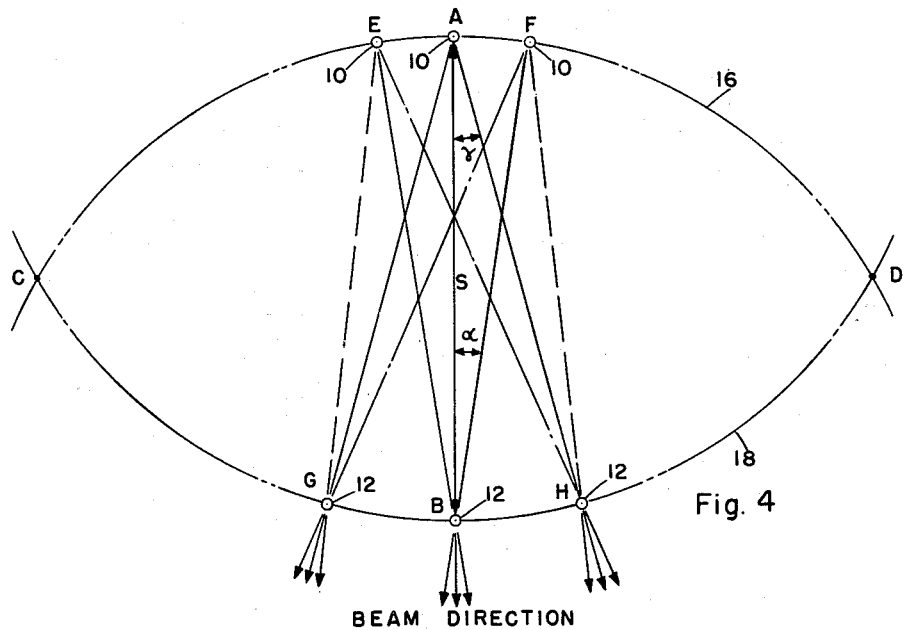
FIG. 4 is a diagram of one arrangement of the antenna arrays.

Antennas 10 and 12, as illustrated in this example, are in arrays of three antennas each and are arranged in plan form as indicated in FIG. 4. The antennas are disposed along base lines 16 and 18, which in this instance are arcs of two intersecting circles, the term "base line" here denoting loci for antenna locations dictated by the specific approach pattern required and the loci being substantially transverse to the primary glide path axis. The two arcs CAD and CBD thus constitute the basic geometry of the system. One antenna 10 is located on base line 16 on a line connecting the centers of radius of base lines 16 and 18, with the other antennas 10 equally spaced on either side. Similarly, one antenna 12 is located on base line 18 also on a line connecting the centers of radius, with the other antennas 12 equally spaced on either side, but at a greater spacing than antennas 10, as shown in this specific arrangement. To simplify description the arcs are illustrated in this instance as each intersecting the radius of the other arc, although this is not essential as will be hereinafter apparent.

For further convenience of description the antennas 10 are identified in FIG. 4 at points A, E and F, the antennas 12 being at points B, G and H. Antennas A and B, being on the axis of the complete system, are considered as spaced at the basic distance S. It will then be seen that the spacings of AG, AH, BE and BF are also equal to S, being equal radii. Spacings of EG and FH are less than S, while spacings of EH and FG are greater than S. The system thus contains nine effective pairs of antennas at different azimuth angles, AB and BA being common. Of these, five pairs are spaced at distance S; two, indicated in dash line, are spaced at less than S; and two indicated in broken line, are spaced at more than S, the average being substantially equal to S. The FLY DOWN and FLY UP errors resulting from the non-nominal spacings of antenna pairs EG, FH, EH and FG cancel each other and a true glide path indication is obtained over a wide azimuth angle covered by the beams of the various antenna pairs. The effective beams are divergent toward an approaching aircraft since antennas 12 are spaced more widely than antennas 10.

Figure 3:
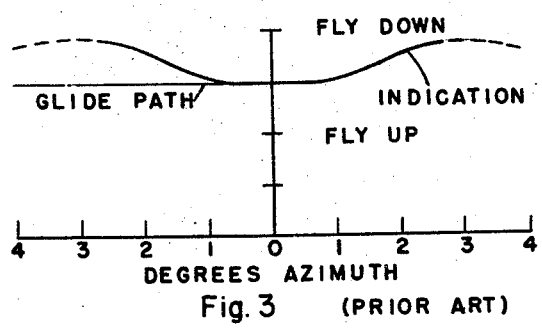
FIG. 3 is a graph of the glide path indication obtainable without the present system.
Figure 6:
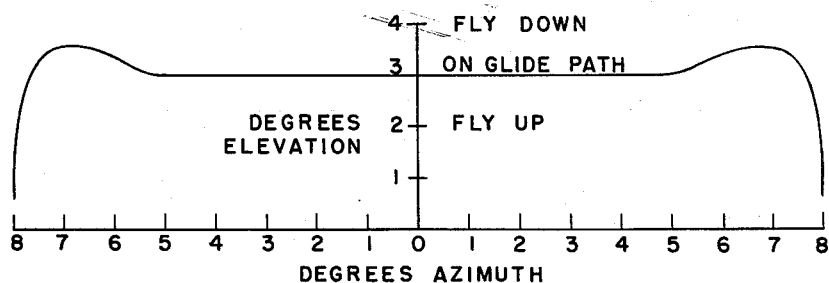
FIG. 6 is a graph of the glide path indication obtainable with these antenna arrangements.

With a single pair of antennas a received signal response would be obtained as indicated in FIG. 3. A true glide path indication would be obtained over a narrow angle of azimuth and would deteriorate in accuracy outside the limited zone. With the multiple array system of FIG. 4, an accurate glide path indication would be received over a much wider angle of azimuth, as indicated in FIG. 6. The useful range of azimuth can be varied according to requirements by changing the spacing of the antennas along their respective base lines and thus changing the azimuth angles $\gamma$ and $\alpha$ between the array axis and the beams diverging from the axis.

Figure 5:
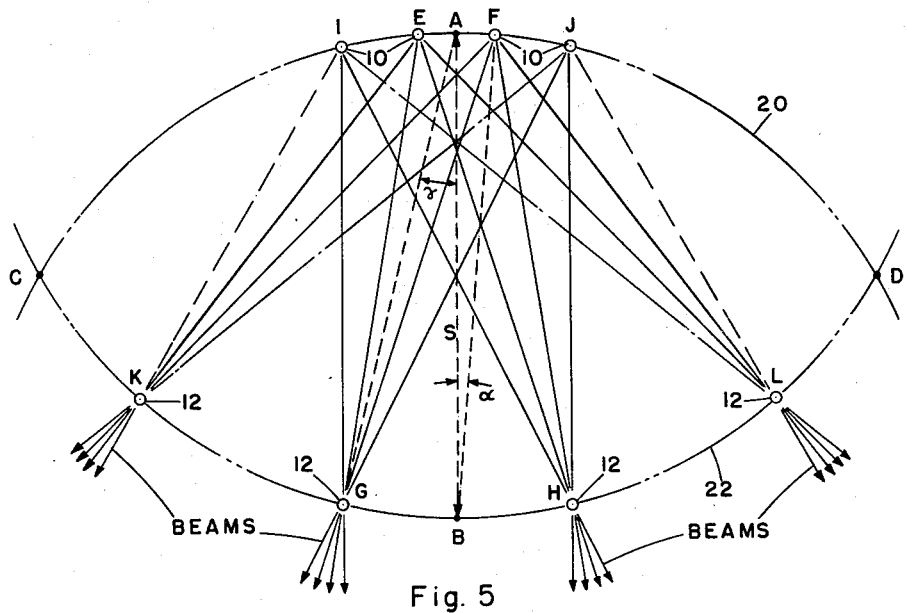
FIG. 5 is a diagram of an alternative arrangement of the antenna arrays.

The system is not limited to six antennas but may have other numbers, an eight antenna arrangement being illustrated in FIG. 5. In this configuration four antennas 10 are spaced along base line 20 and four antennas 12 along base line 22, again using the intersecting arcs CAD and CBD. With the antennas spaced equally about the array axis there are no antennas actually on the axis at the nominal spacing S. However the combination of antenna pairs with spacings greater and less than S cancels out the errors and results in the required wide angle zone of true indication of glide path.

Figure 7:
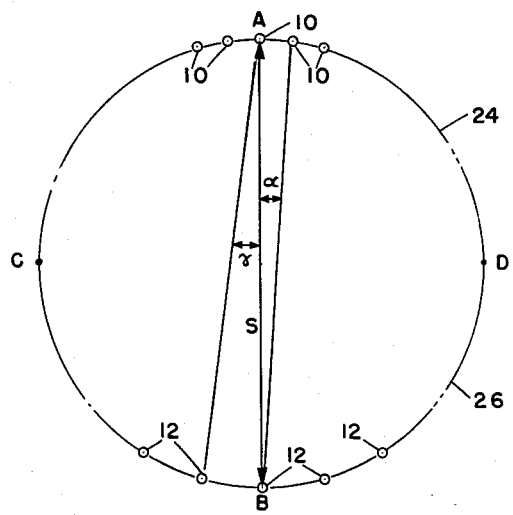
FIG. 7 is a diagram of a specific arrangement of antennas.

The system geometry need not be the specific arrangement of intersecting arcs illustrated in FIGS. 4 and 5, but could be modified somewhat while still retaining the necessary antenna relationship. In FIG. 7, for instance, the arcuate base lines CAD and CBD have been separated to have a common center of radius and thus form a complete circle. The arrays of antennas 10 and 12 are spaced along the arcuate base lines 24 and 26, respectively, about the array axis AB, ten antennas being indicated as an example of a further arrangement. The spacings and angular orientations of the various pairs of antennas are arranged to suit, as described above.

Figure 8:
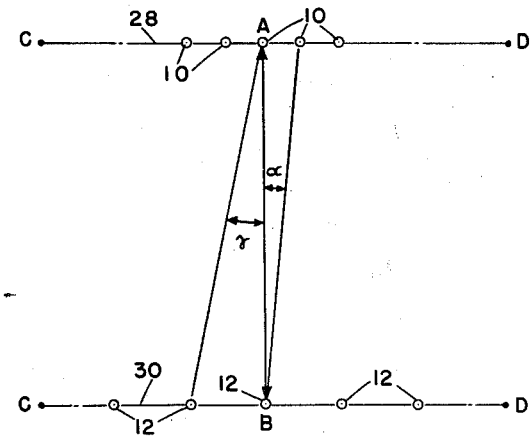
FIG. 8 is a diagram of a further specific arrangement of antennas.

Another example is illustrated in FIG. 8, wherein the base lines CAD and CBD represent arcs of infinite radius and are straight lines parallel to each other. The antennas 10 and 12 are again spaced along their respective base lines 28 and 30 about the array axis AB, which in this instance is perpendicular to the base lines. In this particular arrangement the spacing between base lines 28 and 30 is slightly less than the nominal distance S, so that the average spacing of the various pairs of antennas is S, in order to obtain the overall wide angle accuracy.

In each instance the antennas are arranged in two arrays along individual base lines, one array of antennas being more widely spaced than the other and the distance between the base lines being such that the average distance between different pairs of antennas in the two arrays is substantially equal to a predetermined nominal distance necessary for proper transmission of a glide path signal. With an antenna pattern symmetrical about an axis corresponding to the desired glide path, errors due to different spacings of various antenna pairs are self-cancelling.

The electronic equipment for generation and transmission of the required signals and the receiving equipment carried in the aircraft can vary considerably and are not critical to the present invention.

I claim:
1. A wide angle glide path antenna system, comprising:
a plurality of antennas each having a beam type radiation pattern;
certain of said antennas being spaced along a first base line;
others of said antennas being spaced along a second base line;
said base lines being spaced apart such that the average spacing between all the pairs of antennas, each pair comprising one antenna on one base line and another antenna on the other base line, is substantially equal to a predetermined nominal spacing at which signals from each pair of antennas are in phase.

2. A wide angle glide path antenna system, comprising:
a plurality of antennas each having a beam type radiation pattern;
a first array of said antennas being spaced along a first base line;
a second array of said antennas being spaced along a second base line with the beams of the two arrays overlapping;
the spacing between said first and second base lines being such that the average spacing between all the pairs of antennas, each pair comprising one antenna on one base line and another antenna on the other base line, is substantially equal to a predetermined nominal spacing at which signals from each pair of antennas are in phase.

3. A wide angle glide path antenna system, comprising:
a plurality of antennas each having a beam type radiation pattern;
a first array of said antennas being spaced along a first base line;
a second array of said antennas being spaced along a second base line with the beams of the two arrays overlapping;
the spacing between said first and second base lines being such that the average spacing between all the pairs of antennas, each pair comprising one antenna on one base line and another antenna on the other base line, is substantially equal to a predetermined nominal spacing at which signals from each pair of antennas are in phase;
the spacing along the base line of the antennas in said second array being greater than those in said first array, whereby the overlapped beams of opposed pairs of antennas are divergent.

4. An antenna system according to claim 3, wherein said base lines are arcs of intersecting circles.

5. An antenna system according to claim 3, wherein said base lines are arcs of intersecting circles, each arc intersecting the center of radius of the other arc.

6. An antenna system according to claim 3, wherein said base lines are arcs of circles having a common center of radius and equal radii.

7. An antenna system according to claim 3, wherein said base lines are arcs of intersecting circles of substantially infinite radius.

References Cited by the Examiner
UNITED STATES PATENTS
2,463,095   3/49   Wight et al. _____ 343—108

CHESTER L. JUSTUS, *Primary Examiner.*